(12) United States Patent
Tomono et al.

(10) Patent No.: US 8,873,077 B2
(45) Date of Patent: Oct. 28, 2014

(54) IMAGE FORMING APPARATUS, APPLICATION SWITCHING METHOD, AND NON-TRANSITORY COMPUTER-READABLE RECORDING MEDIUM ENCODED WITH APPLICATION SWITCHING PROGRAM

(71) Applicant: Konica Minolta, Inc., Chiyoda-ku (JP)

(72) Inventors: Kazuaki Tomono, Okazaki (JP); Kenji Matsuhara, Kawanishi (JP); Kenichi Takahashi, Sennan-gun (JP); Kazumi Sawayanagi, Itami (JP); Yosuke Taniguchi, Osaka (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/972,377

(22) Filed: Aug. 21, 2013

(65) Prior Publication Data

US 2014/0055801 A1 Feb. 27, 2014

(30) Foreign Application Priority Data

Aug. 23, 2012 (JP) ................................. 2012-184259

(51) Int. Cl.
*G06F 3/12* (2006.01)
*H04N 1/00* (2006.01)

(52) U.S. Cl.
CPC ........ *H04N 1/00278* (2013.01); *H04N 1/00209* (2013.01); *H04N 2201/0094* (2013.01); *H04N 1/00938* (2013.01)
USPC ......................................... 358/1.13; 358/1.15

(58) Field of Classification Search
CPC .......... H04N 1/00209; H04N 1/00278; H04N 1/00938; H04N 2201/0094

USPC ................................................ 358/1.13, 1.15
See application file for complete search history.

(56) References Cited

U.S. PATENT DOCUMENTS

| 2004/0109187 A1* | 6/2004 | Matsushima ................. 358/1.13 |
| 2004/0218208 A1* | 11/2004 | Akiyoshi et al. ............. 358/1.15 |
| 2005/0046887 A1 | 3/2005 | Shibata et al. |
| 2006/0164670 A1 | 7/2006 | Morita |
| 2011/0292428 A1* | 12/2011 | Ishii ............................ 358/1.13 |

FOREIGN PATENT DOCUMENTS

| JP | 2002-084383 A | 3/2002 |
| JP | 2005-080017 A | 3/2005 |

* cited by examiner

*Primary Examiner* — Jeremiah Bryar
*Assistant Examiner* — Quyen V Ngo
(74) *Attorney, Agent, or Firm* — Buchanan Ingersoll & Rooney PC

(57) ABSTRACT

A control portion of an image forming apparatus includes an internal control portion to execute a process predetermined for an internal command, a first application executing portion, and an application control portion to convert an application command output from one of second application executing portions into an internal command for output to the internal control portion. The application control portion includes a current task setting portion to set a second application executing portion to a currently selected state, and an arbitration portion to output operation identification information of a common operation accepted, to the second application executing portion currently selected. The first application executing portion includes a post-transition application determining portion which, when a process switching operation is accepted, determines a second application executing portion to be changed to the currently selected state next, on the basis of the process switching operation and the second application executing portion currently selected.

12 Claims, 12 Drawing Sheets

F I G. 5
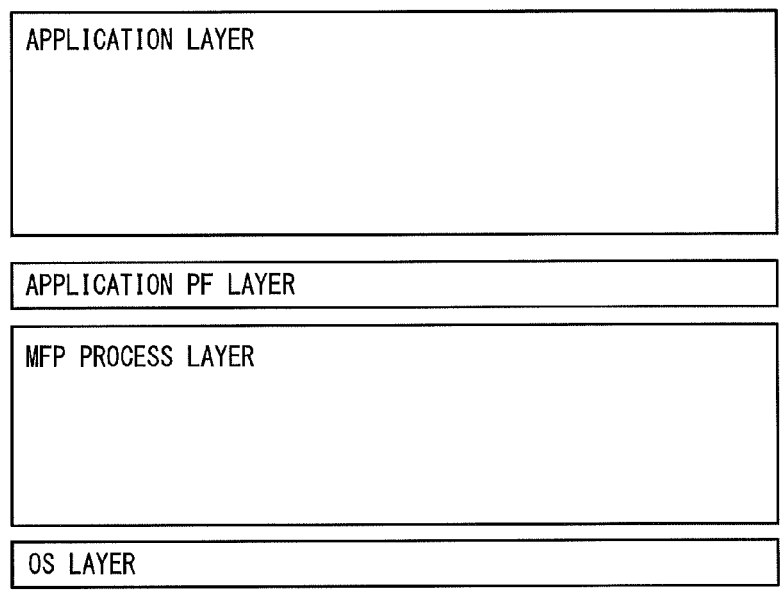

F I G. 7

| CURRENT TASK | OPERATION NAME | POST-TRANSITION TASK |
|---|---|---|
| BOX MANAGEMENT | BOX | NONE |
| | FAX | FACSIMILE TRANSMISSION |
| | COPY | IMAGE FORMATION |
| FACSIMILE TRANSMISSION | BOX | BOX MANAGEMENT |
| | FAX | NONE |
| | COPY | IMAGE FORMATION |
| IMAGE FORMATION | BOX | BOX MANAGEMENT |
| | FAX | FACSIMILE TRANSMISSION |
| | COPY | NONE |

IMAGE FORMING APPARATUS, APPLICATION SWITCHING METHOD, AND NON-TRANSITORY COMPUTER-READABLE RECORDING MEDIUM ENCODED WITH APPLICATION SWITCHING PROGRAM

This application is based on Japanese Patent Application No. 2012-184259 filed with Japan Patent Office on Aug. 23, 2012, the entire content of which is hereby incorporated by reference.

BACKGROUND OF THE INVENTION

1. Field of the Invention

The present invention relates to an image forming apparatus, an application switching method, and a non-transitory computer-readable recording medium encoded with an application switching program. More particularly, the present invention relates to an image forming apparatus into which an application program can be installed, an application switching method executed in the image forming apparatus, and a non-transitory computer-readable recording medium encoded with an application switching program for causing a computer to execute the application switching method.

2. Description of the Related Art

Some recent image forming apparatuses, typified by multi-function peripherals (MFPs), allow application programs to be installed therein. A user can customize an MFP by installing therein an application program according to the type of usage.

Japanese Patent Application Laid-Open No. 2002-084383 describes an image forming apparatus in which portions common to applications are bracketed as a common system service, a platform is formed using the common system service and a versatile OS, and a printer application, a copy application, and other various applications are installed on the platform.

According to the conventional image forming apparatus, the portions common to applications are formed as a common system service on the platform. This means that, in the case where a hardware resource such as a keyboard is replaced with another one, or in the case where a new application program is developed, the platform itself may have to be changed.

SUMMARY OF THE INVENTION

An aspect of the present invention provides an image forming apparatus which has hardware resources including an operation accepting portion to accept an instruction operation designated by an operation user from among a plurality of kinds of operations, and a control portion to control the hardware resources, wherein the control portion includes: an internal control portion operable, in response to an input of an internal command, to execute a process predetermined for the input internal command in order to control the hardware resources; a first application executing portion to execute an application switching program; a plurality of second application executing portions each configured to execute a corresponding customization application program different from the application switching program; and an application control portion operable, in the case where one of the plurality of second application executing portions outputs an application command which has been released for controlling the internal control portion, to convert the output application command into the internal command and output the obtained internal command to the internal control portion, wherein the application control portion includes a current task setting portion to set one of the plurality of second application executing portions to a currently selected state in which the portion is capable of receiving a common operation predetermined from among a plurality of operations acceptable by the operation accepting portion, and an arbitration portion operable, in the case where the common operation is accepted by the operation accepting portion, to output operation identification information for identifying the common operation to the one of the plurality of second application executing portions that has been set in the currently selected state, wherein the first application executing portion includes a post-transition application determining portion operable, in the case where the operation accepting portion accepts a process switching operation predetermined, besides the common operation, from among the plurality of operations acceptable by the operation accepting portion, to determine one of the plurality of second application execution portions that should be changed to the currently selected state next, on the basis of the one of the plurality of second application executing portions being set in the currently selected state and on the basis of the accepted process switching operation, and wherein the current task setting portion sets the second application executing portion determined by the post-transition application determining portion to the currently selected state.

Another aspect of the present invention provides an application switching method performed by an image forming apparatus which has hardware resources including an operation accepting portion to accept an instruction operation designated by an operation user from among a plurality of kinds of operations, and a control portion to control the hardware resources, the control portion including an internal control portion operable, in response to an input of an internal command, to execute a process predetermined for the input internal command in order to control the hardware resources, a plurality of application executing portions each configured to execute a corresponding customization application program different from an application switching program, and an application control portion operable, in the case where one of the plurality of application executing portions outputs an application command which has been released for controlling the internal control portion, to convert the output application command into the internal command and output the obtained internal command to the internal control portion, the application control portion including a current task setting portion to set one of the plurality of application executing portions to a currently selected state in which the portion is capable of receiving a common operation predetermined from among a plurality of operations acceptable by the operation accepting portion, and an arbitration portion operable, in the case where the common operation is accepted by the operation accepting portion, to output operation identification information for identifying the common operation to the one of the plurality of application executing portions that has been set in the currently selected state, wherein the method causes the control portion to perform: a post-transition application determining step of, in the case where the operation accepting portion accepts a process switching operation predetermined, besides the common operation, from among the plurality of operations acceptable by the operation accepting portion, determining one of the plurality of application execution portions that should be changed to the currently selected state next, on the basis of the one of the plurality of application executing portions being set in the currently selected state and on the basis of the accepted process switching operation; and a step of causing the current task setting portion to set the determined application executing portion to the currently selected state.

Yet another aspect of the present invention provides a non-transitory computer-readable recording medium encoded with an application switching program performed by a computer which controls an image forming apparatus having hardware resources including an operation accepting portion to accept an instruction operation designated by an operation user from among a plurality of kinds of operations, the computer including an internal control portion operable, in response to an input of an internal command, to execute a process predetermined for the input internal command in order to control the hardware resources, a plurality of application executing portions each configured to execute a corresponding customization application program different from an application switching program, and an application control portion operable, in the case where one of the plurality of application executing portions outputs an application command which has been released for controlling the internal control portion, to convert the output application command into the internal command and output the obtained internal command to the internal control portion, the application control portion including a current task setting portion to set one of the plurality of application executing portions to a currently selected state in which the portion is capable of receiving a common operation predetermined from among a plurality of operations acceptable by the operation accepting portion, and an arbitration portion operable, in the case where the common operation is accepted by the operation accepting portion, to output operation identification information for identifying the common operation to the one of the plurality of application executing portions that has been set in the currently selected state, wherein the program causes the computer to perform: a post-transition application determining step of, in the case where the operation accepting portion accepts a process switching operation predetermined, besides the common operation, from among the plurality of operations acceptable by the operation accepting portion, determining one of the plurality of application execution portions that should be changed to the currently selected state next, on the basis of the one of the plurality of application executing portions being set in the currently selected state and on the basis of the accepted process switching operation; and a step of causing the current task setting portion to set the determined application executing portion to the currently selected state.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 5 shows an example of the software architecture of a CPU included in the MFP;

FIG. 7 shows an example of a transition relation table;

DESCRIPTION OF THE PREFERRED EMBODIMENTS

Figure 1:
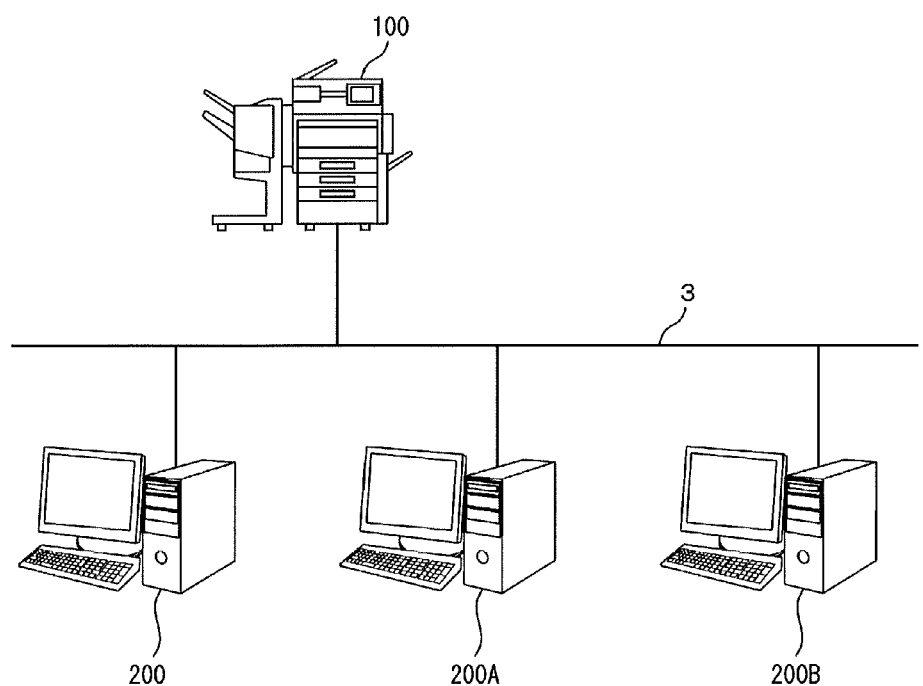
FIG. 1 schematically shows an image forming system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 schematically shows an image forming system according to an embodiment of the present invention. Referring to FIG. 1, an image forming system includes a multi-function peripheral (hereinafter, referred to as "MFP") 100 and personal computers (hereinafter, referred to as "PCs") 200, 200A, and 200B, which are each connected to a network 3. MFP 100 and PCs 200, 200A, and 200B can communicate with each other via network 3.

While one MFP 100, as an example of an image forming apparatus, is connected to network 3 in FIG. 1, the number of the MFPs is not limited thereto; at least one MFP may be connected to network 3. Further, the image forming apparatus is not limited to the MFP; it may be, e.g., a computer, facsimile machine, printer, or other device, as long as it is provided with the image processing function.

Figure 2:
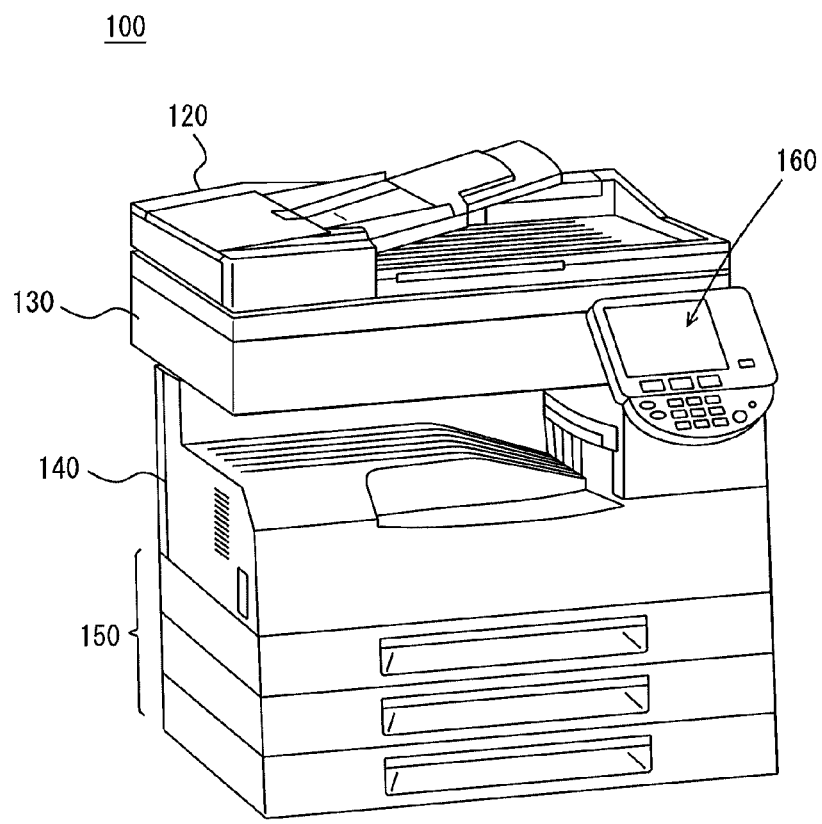
FIG. 2 is a perspective view of an MFP according to an embodiment of the present invention.
Figure 3:
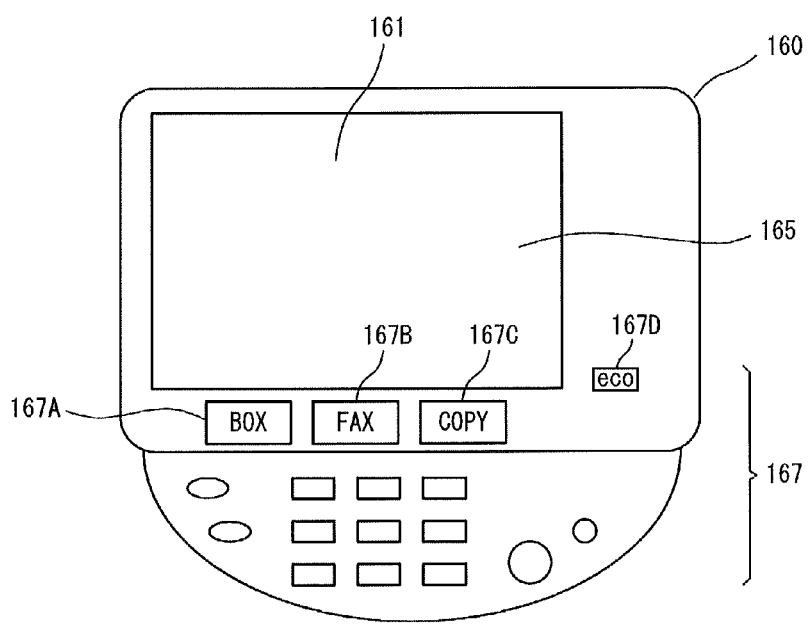
FIG. 3 is a plan view showing an example of an operation panel.

FIG. 2 is a perspective view of an MFP according to an embodiment of the present invention. FIG. 3 is a plan view showing an example of an operation panel. Referring to FIGS. 2 and 3, MFP 100 includes: a document reading portion 130 for reading a document; an automatic document feeder 120 for feeding a document to document reading portion 130; an image forming portion 140 for forming an image on a sheet of paper or the like on the basis of image data which is output from document reading portion 130 that has read a document; a paper feeding portion 150 for feeding a sheet of paper to image forming portion 140; and an operation panel 160 serving as a user interface.

Operation panel 160 is arranged on an upper surface of MFP 100. Operation panel 160 includes: a display portion 161, a touch panel 165 which is made up of a transparent member and disposed on a surface of display portion 161, and a hard key portion 167. Display portion 161 is, for example, a liquid crystal display (LCD), and displays an instruction menu for a user, information about acquired image data, and so on. Hard key portion 167 is provided with a plurality of keys including four hard keys 167A to 167D having the characters "BOX", "FAX", "COPY", and "ECO" respectively displayed thereon, and accepts input data, such as instructions, characters, and numerical characters, according to the key operations by the user. Touch panel 165 detects a position on the display surface of display portion 161. Touch panel 165 is disposed on an upper or lower surface of display portion 161.

Automatic document feeder 120 automatically feeds a plurality of documents set on a document feed tray, one by one, to a predetermined document reading position set on a platen glass of document reading portion 130, and outputs the document, the image of which has been read by document reading portion 130, onto a document output tray. Document reading portion 130 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, and outputs the image data to image forming portion 140. Paper feeding portion 150 feeds a sheet of paper, stored in a paper feed tray, to image forming portion 140.

Image forming portion 140 forms an image using well-known electrophotography. Image forming portion 140 performs various kinds of data processing such as shading compensation on image data received from document reading portion 130 and, on the basis of the processed image data, or on the basis of externally received image data, forms an image on a sheet of paper fed by paper feeding portion 150.

Figure 4:
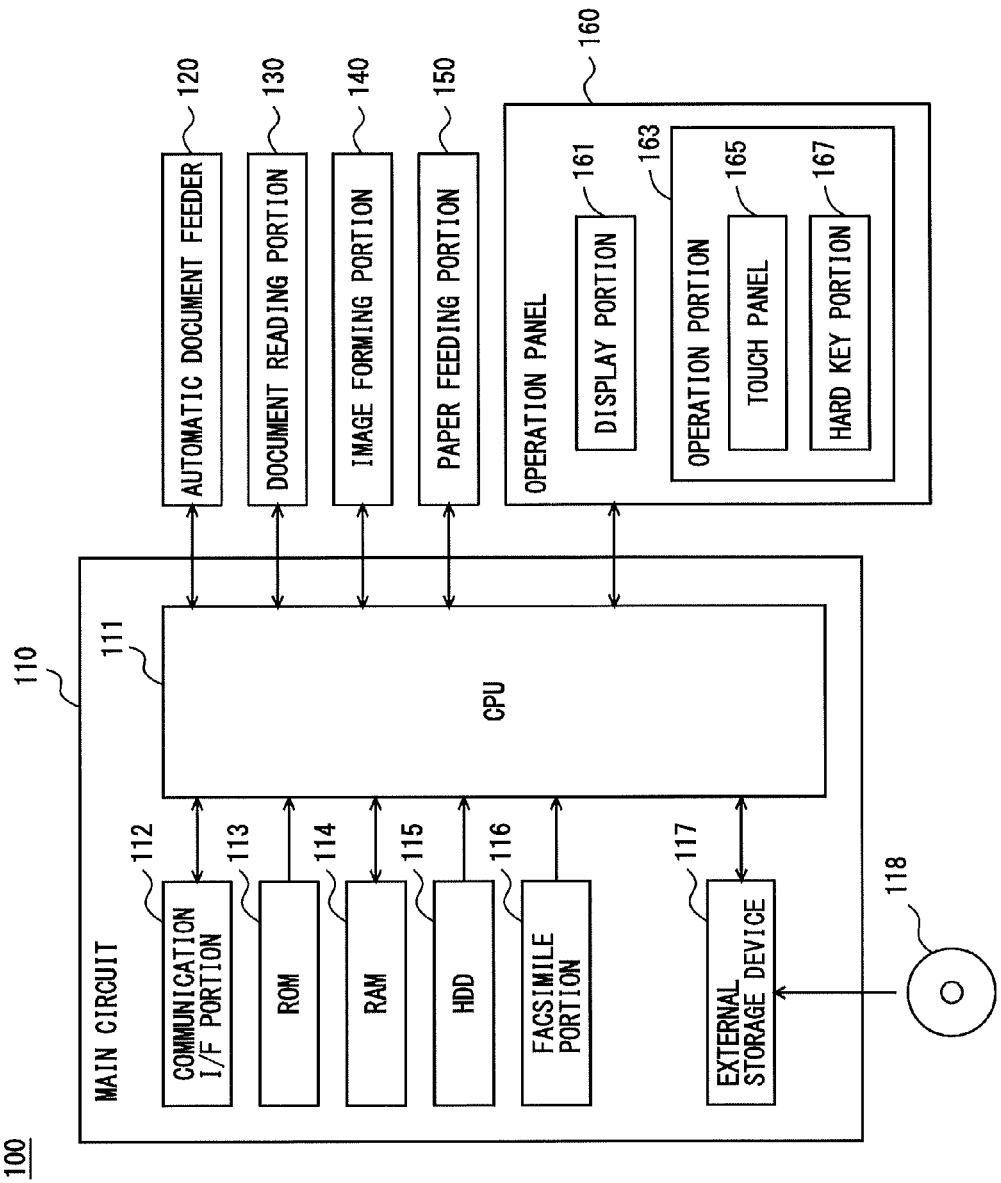
FIG. 4 is a block diagram schematically showing an example of the hardware configuration of the MFP.

FIG. 4 is a block diagram schematically showing an example of the hardware configuration of the MFP. Referring to FIG. 4, MFP 100 includes a main circuit 110. Main circuit 110 includes: a central processing unit (CPU) 111; a communication interface (I/F) portion 112; a read only memory (ROM) 113; a random access memory (RAM) 114; a hard disk drive (HDD) 115 as a mass storage; a facsimile portion 116; and an external storage device 117. CPU 111 is connected with automatic document feeder 120, document reading portion 130, image forming portion 140, paper feeding portion 150, and operation panel 160, and is responsible for overall control of MFP 100.

ROM 113 stores a program to be executed by CPU 111 or data necessary for execution of the program. RAM 114 is used as a work area when CPU 111 executes a program. Further, RAM 114 temporarily stores read images continuously transmitted from document reading portion 130.

Facsimile portion 116 is connected to public switched telephone networks (PSTN), and transmits facsimile data to or receives facsimile data from the PSTN. Facsimile portion 116 stores the received facsimile data in HDD 115. Alternatively, facsimile portion 116 converts the data into print data which can be printed in image forming portion 140, and outputs the print data to image forming portion 140, thereby causing image forming portion 140 to form an image on a sheet of paper on the basis of the facsimile data received by facsimile portion 116. Further, facsimile portion 116 converts the data stored in HDD 115 to facsimile data, and transmits the facsimile data to a facsimile machine connected to the PSTN.

Communication I/F portion 112 is an interface for connecting MFP 100 to a network. Communication I/F portion 112 communicates with another computer connected to the network, using a communication protocol such as the transmission control protocol (TCP) or the file transfer protocol (FTP). It is noted that the protocol for communication is not particularly limited; any protocol can be used. The network to which communication I/F portion 112 is connected is, for example, a local area network (LAN). It may be connected in a wired or wireless manner. The network is not necessarily the LAN; it may be a wide area network (WAN), a network using the public switched telephone networks (PSTN), or the like. Furthermore, the network is connected to the Internet, so that it is possible for MFP 100 to communicate with a computer, such as a server, connected to the Internet.

External storage device 117, which is controlled by CPU 111, is mounted with a compact disc read-only memory (CD-ROM) 118 or a semiconductor memory. CPU 111 is capable of accessing CD-ROM 118 or the semiconductor memory via external storage device 117. CPU 111 loads the program recorded on CD-ROM 118 or the semiconductor memory mounted on external storage device 117, into RAM 114 for execution. It is noted that the program executed by CPU 111 is not restricted to the program recorded on CD-ROM 118. CPU 111 may load a program stored in HDD 115, into RAM 114 for execution. In this case, via the network to which communication I/F portion 112 is connected, another computer connected to the network may rewrite the program stored in HDD 115 of MFP 100, or additionally write a new program therein. Further, MFP 100 may download a program from another computer connected to the network, and store the program in HDD 115. As used herein, the "program" includes, not only the program which CPU 111 can execute directly, but also a source program, a compressed program, an encrypted program, and so on.

It is noted that the medium for storing a program executed by CPU 111 is not restricted to CD-ROM 118. It may be an optical disc (magneto-optical (MO) disc, mini disc (MD), digital versatile disc (DVD)), an IC card, an optical card, or a semiconductor memory such as a mask ROM, an erasable programmable ROM (EPROM), an electrically erasable and programmable ROM (EEPROM), or the like.

Operation panel 160 includes display portion 161 and an operation portion 163. Display portion 161 is a display such as a liquid crystal display (LCD) or an organic electro-luminescence display (ELD), and displays an instruction menu for a user, information about acquired image data, and so on. Operation portion 163 includes touch panel 165 and hard key portion 167 made up of a plurality of hard keys. The hard keys included in hard key portion 167 each include a contact switch, which is connected to CPU 111. Each hard key, when depressed by an operation user, closes its contact to close a circuit connected to CPU 111. Each hard key closes the circuit while being depressed by an operation user who operates MFP 100, whereas it opens the circuit while not being depressed by the operation user.

When a plurality of keys included in hard key portion 167 are depressed, operation portion 163 accepts input data, such as instructions, characters, and numerical characters, according to the depressed keys. Touch panel 165 is disposed on an upper or lower surface of display portion 161, and outputs the coordinates of a position pushed by the operation user to CPU 111. Touch panel 165 detects the position designated by the operation user with his/her finger or a stylus pen, and outputs the coordinates of the detected position to CPU 111. Touch panel 165 preferably has a size equal to or greater than that of the display surface of display portion 161. As touch panel 165 is disposed on the surface of display portion 161, when the operation user designates a position on the display surface of display portion 161, touch panel 165 outputs the coordinates of the position that the operation user has designated on the display surface of display portion 161, to CPU 111. Touch panel 165 may be, for example, of a resistive type, a surface acoustic wave type, an infrared ray type, an electromagnetic induction type, or a capacitance type, although it is not limited to these types.

Operations that can be accepted by operation portion 163 include an operation of depressing any of the keys included in hard key portion 167 and an operation of designating a position on touch panel 165. Hard key portion 167 includes four hard keys 167A to 167D having the characters "BOX", "FAX", "COPY", and "ECO" respectively displayed thereon. Three hard keys 167A, 167B, and 167C with the characters "BOX", "FAX", and "COPY", respectively, are process switching keys assigned with process switching operations for designating switching of the process to be executed by MFP 100. Hard key 167D with the characters "ECO" is a mode switching key assigned with a mode switching operation for designating switching of the mode of MFP 100 from a normal mode to a power saving mode in which less electricity is consumed. When hard key 167A, 167B, or 167C is depressed, operation portion 163 accepts the corresponding process switching operation. When hard key 167D is depressed, operation portion 163 accepts the mode switching operation. Of the operations that operation portion 163 is able to accept, any operations other than the operations of depressing the process switching keys (hard keys 167A, 167B, 167C) and the mode switching key (hard key 167D) are each referred to as a common operation.

FIG. 5 shows an example of the software architecture of the CPU included in the MFP. Referring to FIG. 5, in CPU 111, an operating system (OS) layer is formed as the bottom layer, and an MFP process layer is formed above the OS layer. Above the MFP process layer, an application platform (PF) layer is formed, and an application layer is formed above the application PF layer.

A task for CPU 111 to execute an OS program belongs to the OS layer. The task belonging to the OS layer performs a process of controlling the hardware resources in MFP 100. Here, the hardware resources include communication I/F portion 112, ROM 113, RAM 114, HDD 115, facsimile portion 116, external storage device 117, automatic document feeder 120, document reading portion 130, image forming portion 140, paper feeding portion 150, and operation panel 160. The task belonging to the OS layer controls the hardware resources in accordance with an operating command input from the MFP process layer.

A task for CPU 111 to execute an application program belongs to the application layer. In the case where two or more application programs are installed into MFP 100, two or more tasks for executing the respective application programs may belong to the application layer. The application programs include programs for customizing a user interface and the like so as to cause MFP 100 to perform the copying process, scanning process, printing process, facsimile transmitting/receiving process, data transmitting/receiving process, and so on. It is noted that the application programs are not restricted to the above-described programs; there may be another application program. An application program is described, for example, in a programming language such as Python, although the language is not particularly limited.

The task for executing an application program performs a plurality of types of processes determined by the application program. The plurality of types of processes include a process of causing a task belonging to the MFP process layer to perform a process to be performed in the MFP process layer. In the case of causing the task belonging to the MFP process layer to perform a process, the task for executing the application program outputs an application command. The application command is a command which has been released as an application program interface (API). This facilitates creation of an application program for causing MFP 100 to perform a process. Releasing something means that a third party other than the manufacturer of MFP 100 can use it. The third party is able to use the application commands to develop an application program that can be installed into MFP 100.

The application PF layer, located between the application layer and the MFP process layer, has belonging thereto a task for arbitrating a plurality of tasks belonging to the application layer and also controlling the application commands output from the plurality of tasks belonging to the application layer. More specifically, the application PF layer brings one of the tasks belonging to the application layer into a currently selected state in which a user can input an operation. The application PF layer accepts the application commands output from the plurality of tasks belonging to the application layer, converts the application commands into internal commands, and outputs the obtained internal commands to the MFP process layer.

Application commands are associated with internal commands in advance. For example, a commands correspondence table may be stored. One application command may correspond to one internal command, or one application command may correspond to a set of two or more internal commands. Further, two or more application commands of different versions may correspond to one internal command or to a set of two or more internal commands. This can address the case where application programs are of different versions. The internal command is a command which depends upon the hardware resource(s) in MFP 100. Internal commands are not released usually, although they may be released.

The MFP process layer, located between the application PF layer and the OS layer, has belonging thereto a task for CPU 111 to execute an MFP control program. The MFP process layer has belonging thereto a task for converting an internal command, output from a task belonging to the application PF layer, into an operating command which can be interpreted by a task belonging to the OS layer, and outputting the operating command to the task belonging to the OS layer. While an internal command may be actually converted into one or more operating commands which can be executed by a task belonging to the OS layer, for the convenience sake, it is here assumed that one internal command is converted into one operating command executable by the task belonging to the OS layer.

Figure 6:
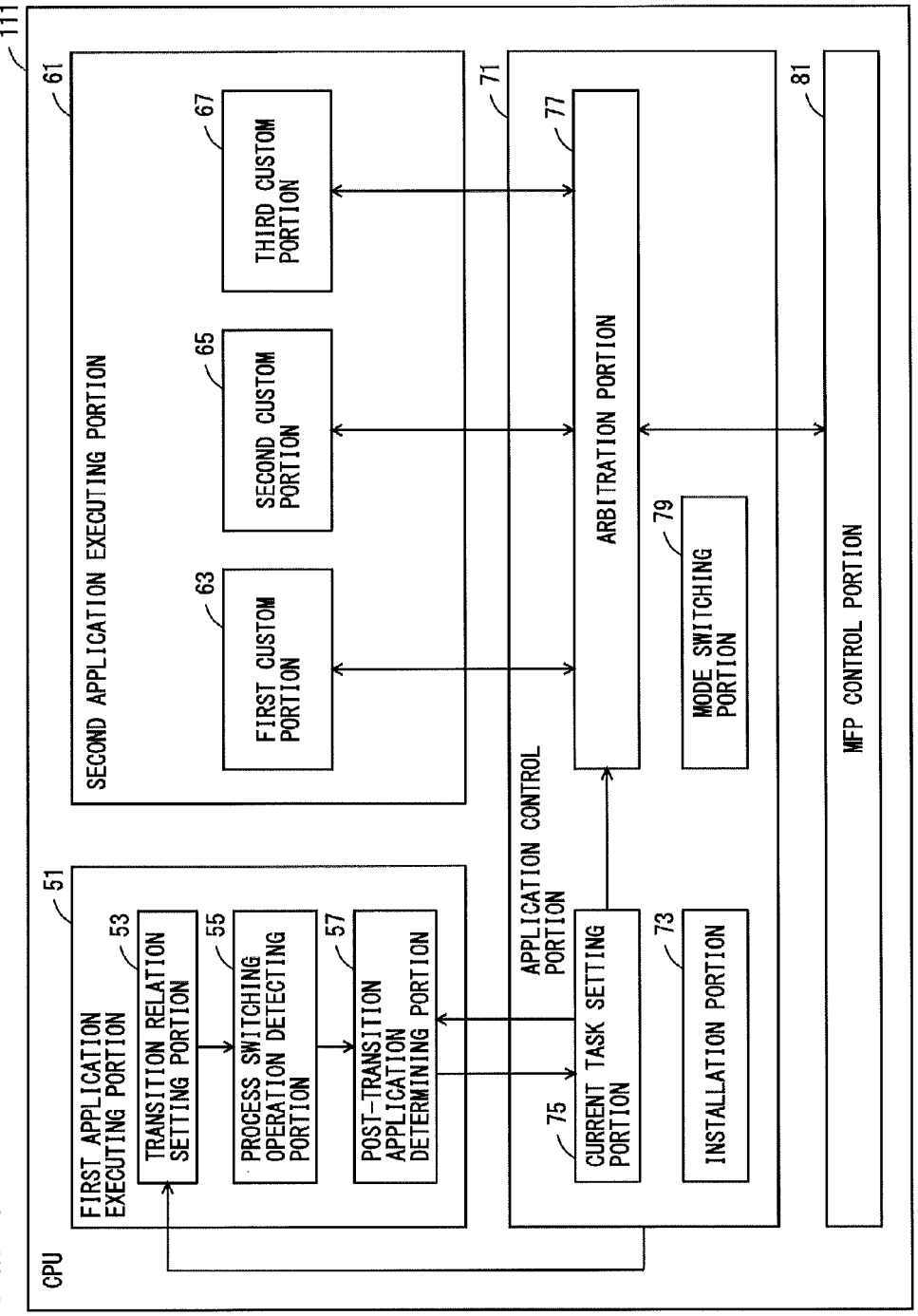
FIG. 6 is a block diagram showing, by way of example, the functions of the CPU included in the MFP according to an embodiment of the present invention.

FIG. 6 is a block diagram showing, by way of example, the functions of the CPU included in the MFP according to an embodiment of the present invention. The functions shown in FIG. 6 are implemented by CPU 111 included in MFP 100 as CPU 111 executes programs stored in ROM 113, HDD 115, or CD-ROM 118. Specifically, the functions are implemented by CPU 111 as CPU 111 executes an OS program, an MFP control program, an application control program, and an application program.

Referring to FIG. 6, CPU 111 includes a first application executing portion 51, a second application executing portion 61, an application control portion 71, and an MFP control portion 81. First application executing portion 51 and second application executing portion 61 belong to the application layer in the software architecture shown in FIG. 5. First application executing portion 51 and second application executing portion 61 are the functions implemented by tasks for CPU 111 to execute application programs. First application executing portion 51 is implemented by a task for CPU 111 to execute an application switching program. Second application executing portion 61 is implemented by a task for CPU 111 to execute a customization application program, which is different from the application switching program.

It is here assumed that first to third application programs for customization are installed into MFP 100, and CPU 111 executes the first to third application programs. In this case, second application executing portion 61 includes a first custom portion 63, a second custom portion 65, and a third custom portion 67 which are implemented as CPU 111 executes the first, second, and third application programs, respectively.

The first customization application program is a program for performing a process of managing data stored in the BOX, which is a general term representing a plurality of storage areas included in HDD 115. This program's application identification information is "box management". The second customization application program is a program for performing a process of transmitting facsimile data, and its application identification information is "facsimile transmission". The third customization application program is a program for performing a process of forming the image of a document, and its application identification information is "image formation".

While it is here assumed that CPU 111 executes three application programs as described above, the number of customization application programs to be executed by CPU 111 is not restricted thereto; at least one customization application program may be executed by CPU 111.

First custom portion 63 outputs an application command determined by the first application program to application control portion 71. Second custom portion 65 outputs an application command determined by the second application program to application control portion 71. Third custom portion 67 outputs an application command determined by the third application program to application control portion 71.

First application executing portion 51 includes a transition relation setting portion 53, a process switching operation detecting portion 55, and a post-transition application determining portion 57. At the stage when a new application program is installed by an installation portion 73, which will be described later, transition relation setting portion 53 associates, for the new application program being installed, one or more application programs that have already been installed with one or more process switching operations, respectively. Specifically, transition relation setting portion 53 receives, from installation portion 73, application identification information for identifying the application program newly installed. On receipt of the application identification information, transition relation setting portion 53 adds one or more transition records into a transition relation table. Each transition record associates the application identification information of the newly installed application program, operation identification information for identifying a process switching operation, and application identification information of one of the application programs already installed. The transition relation table includes, for one piece of application identification information received from installation portion 73, the transition record(s) of the same number as the process switching operation(s).

More specifically, a setting screen is displayed on display portion 161, in which a list of a plurality of process switching operations is displayed and further, application identification information item(s) of the one or more application programs already installed is/are selectably displayed for each of the process switching operations. When one of the application identification information item(s) of the already installed application program(s) is selected for each of the plurality of process switching operations in accordance with a user operation input to touch panel 165 or hard key portion 167, then the transition records of the same number as the process switching operations are generated. It is here assumed that there are three process switching operations of depressing the respective process switching keys 167A, 167B, and 167C included in the keys in hard key portion 167.

FIG. 7 shows an example of a transition relation table. Referring to FIG. 7, the transition relation table includes a plurality of transition records. The transition records associate, for each current task, each of one or more process switching operations with a task to be brought into a currently selected state next. Each transition record includes a "current task" field, an "operation name" field, and a "post-transition task" field. Here, as identification information of a task, the application identification information of an application program that is executed by the task is used. Therefore, in the "current task" field in a transition record, the application identification information of the application program that is executed by the task in the currently selected state is set.

In the "operation name" field, operation identification information of one of the one or more process switching operations is set. Here, the process switching operations are the operations of depressing the respective ones of three hard keys 167A, 167B, and 167C with the characters "BOX", "FAX", and "COPY", respectively. It is here assumed that the operation identification information of the operation of depressing hard key 167A is "BOX", the operation identification information of the operation of depressing hard key 167B is "FAX", and the operation identification information of the operation of depressing hard key 167C is "COPY".

In the "post-transition task" field, application identification information of the application program executed by the task that should be brought into a currently selected state after the process switching operation specified by the operation identification information set in the "operation name" field has been input is set.

For example, the transition record in the second line shows that when hard key 167B is depressed and the operation identification information "FAX" is accepted during the time when first custom portion 63 which executes the application program having the application identification information "box management" is in the currently selected state (i.e. the current task), second custom portion 65 which executes the application program having the application identification information "facsimile transmission" is the task that should be brought into the currently selected state next. The transition record in the third line shows that when hard key 167C is depressed and the operation identification information "COPY" is accepted during the time when first custom portion 63 which executes the application program having the application identification information "box management" is in the currently selected state, third custom portion 67 which executes the application program having the application identification information "image formation" is the task that should be brought into the currently selected state next.

Returning to FIG. 6, when a user inputs a process switching operation in operation panel 160, process switching operation detecting portion 55 detects the process switching operation input, and outputs operation identification information for identifying the detected process switching operation to post-transition application determining portion 57.

Post-transition application determining portion 57 determines a task (one of first through third custom portions 63, 65, and 67) that is associated with the process switching operation with respect to the current task being set in the currently selected state, as a task that should be set to the currently selected state next. Specifically, post-transition application determining portion 57 receives operation identification information of a process switching operation from process switching operation detecting portion 55, a transition relation table from transition relation setting portion 53, and application identification information of the current task from a current task setting portion 75, which will be described later. In response to reception of the operation identification information of the process switching operation from process switching operation detecting portion 55, post-transition application determining portion 57 refers to the transition relation table to acquire the application identification information that is associated with the application identification information of the current task and the operation identification information of the process switching operation. More specifically, post-transition application determining portion 57 extracts, from the transition records included in the transition relation table, a transition record in which the application identification information of the current task is set in the "current task" field and the operation identification information of the process switching operation is set in the "operation name" field, and acquires the application identification information that is set in the "post-transition task" field in the extracted transition record. Post-transition application determining portion 57 outputs a task switching instruction, including the acquired application identification information and instructing a change of the current task, to current task setting portion 75 described later.

Application control portion 71 is a function implemented by the task for CPU 111 to execute the application control program. Application control portion 71 belongs to the application PF layer in the software architecture shown in FIG. 5.

Application control portion 71 includes installation portion 73, current task setting portion 75, an arbitration portion 77, and a mode switching portion 79. Installation portion 73 installs an application program into MFP 100 in accordance with an installation instruction input by a user. An installation instruction may be received from one of PCs 200, 200A, and 200B by communication I/F portion 112, or may be input into operation panel 160. When a user operates operation panel 160 to input an installation instruction, installation portion 73 accepts the installation instruction from operation portion 163. When a user operates one of PCs 200, 200A, and 200B to remotely control MFP 100 to input an installation instruction, installation portion 73 accepts the installation instruction that communication I/F portion 112 receives from the one of PCs 200, 200A, and 200B.

Installation portion 73 acquires the application program designated by a user. In the case where a user who wishes to cause MFP 100 to read an application program mounts CD-ROM 118 storing the application program on external storage device 117, installation portion 73 reads and acquires the application program stored in CD-ROM 118 via external storage device 117. In the case where a user inputs into MFP 100 an instruction to download an application program stored in a computer connected to network 3, installation portion 73 downloads and acquires the application program via communication I/F portion 112. Installation portion 73 stores the acquired application program into HDD 115. First application executing portion 51 described above reads the application switching program, which has been stored in HDD 115 by installation portion 73, into RAM 114 for execution. First custom portion 63, second custom portion 65, and third custom portion 67 described above read the first, second, and third application programs, respectively, which have been stored in HDD 115 by installation portion 73, into RAM 114 for execution.

When current task setting portion 75 receives a task switching instruction from post-transition application determining portion 57, current task setting portion 75 sets one of first, second, and third custom portions 63, 65, and 67 included in second application executing portion 61, to a currently selected state, in accordance with the task switching instruction. The currently selected state is a state capable of receiving a common operation that is input by a user and accepted by operation panel 160. In other words, when a user inputs a common operation in operation panel 160, the input common operation is output to a current task, which is one of first, second, and third custom portions 63, 65, and 67 that has been set in the currently selected state by current task setting portion 75; the common operation is not output to the other ones of first, second, and third custom portions 63, 65, and 67 that have not been set in the currently selected state. The common operations refer to the operations that operation panel 160 is able to accept, excluding the process switching operations of depressing the process switching keys 167A, 167B, 167C, and the mode switching operation of depressing the mode switching key 167D, which keys are included in hard key portion 167.

Current task setting portion 75 outputs to arbitration portion 77 and first application executing portion 51 the application identification information for identifying the current task, which is one of first, second, and third custom portions 63, 65, and 67 that has been set in the currently selected state.

Arbitration portion 77 converts an application command output from one of first, second, and third custom portions 63, 65, and 67, into an internal command in accordance with a commands correspondence table, and outputs the obtained internal command to MFP control portion 81. The commands correspondence table associates one application command with one or more internal commands. The application commands included in the commands correspondence table may include the application commands of the same type but of different versions. In such a case, each of the application commands of different versions is associated with one or more internal commands. This enables installation of application programs having application commands of different versions described therein. When a new application command appears, the commands correspondence table is updated with a commands correspondence table in which the new application command is associated with one or more internal commands. This enables installation of an application program having the new application command described therein.

Further, arbitration portion 77 receives application identification information from current task setting portion 75, and determines, on the basis of the received application identification information, one of first, second, and third custom portions 63, 65, and 67 that has been set in the currently selected state, to be a current task. Then, when a user inputs a common operation in operation panel 160, arbitration portion 77 outputs the input common operation to the one of first, second, and third custom portions 63, 65, and 67 that has been determined to be the current task.

When a user inputs a mode switching operation in operation panel 160, mode switching portion 79 detects the input mode switching operation, and outputs an instruction to shift to a power saving mode (hereinafter, referred to as "power-saving shift instruction") to first application executing portion 51 and first, second, and third custom portions 63, 65, and 67 included in second application executing portion 61. The mode switching operation is an operation of depressing hard key 167D. When mode switching portion 79 receives a notification of completion of the shift to the power saving mode (hereinafter, referred to as "power-saving shift completion notification") from all of first application executing portion 51 and first, second, and third custom portions 63, 65, and 67, mode switching portion 79 outputs a command informing that the shift to the power saving mode has been completed, to the task for CPU 111 to execute the operating program. This causes the processes by first application executing portion 51 and first, second, and third custom portions 63, 65, and 67 included in second application executing portion 61 to be suspended, resulting in a decrease in power consumed by CPU 111.

It is noted that in the case where a prescribed condition, e.g. that an operation has been detected by operation panel 160, or that data has been received by communication I/F portion 112 or facsimile portion 116, is met during the power saving mode, mode switching portion 79 switches the mode from the power saving mode to the normal mode. For switching the mode from the power saving mode to the normal mode, mode switching portion 79 outputs an instruction to restart the processes, to all of first application executing portion 51 and first, second, and third custom portions 63, 65, and 67.

MFP control portion 81 is a function implemented by the task for CPU 111 to execute the MFP control program. MFP control portion 81 belongs to the MFP process layer in the software architecture shown in FIG. 5. MFP control portion 81 receives an internal command from arbitration portion 77 in application control portion 71, and executes processing determined by the internal command.

The processing determined by an internal command includes processing of controlling the hardware resource(s) included in MFP 100, and data processing. The hardware resources included in MFP 100 include HDD 115, facsimile portion 116, communication I/F portion 112, external storage device 117, automatic document feeder 120, document reading portion 130, image forming portion 140, paper feeding portion 150, and operation panel 160. The data processing is not particularly limited, but may be sharpening, synthesis, enlargement, reduction, or other processing performed on image data.

When MFP control portion 81 executes the processing of controlling the hardware resource(s) included in MFP 100, MFP control portion 81 converts the internal command into an operating command, and outputs the operating command to the task for CPU 111 to execute the operating program. The operating command is a command which can be interpreted by the task for CPU 111 to execute the operating program. The task for CPU 111 to execute the operating program belongs to the OS layer in the software architecture shown in FIG. 5.

Figure 8:
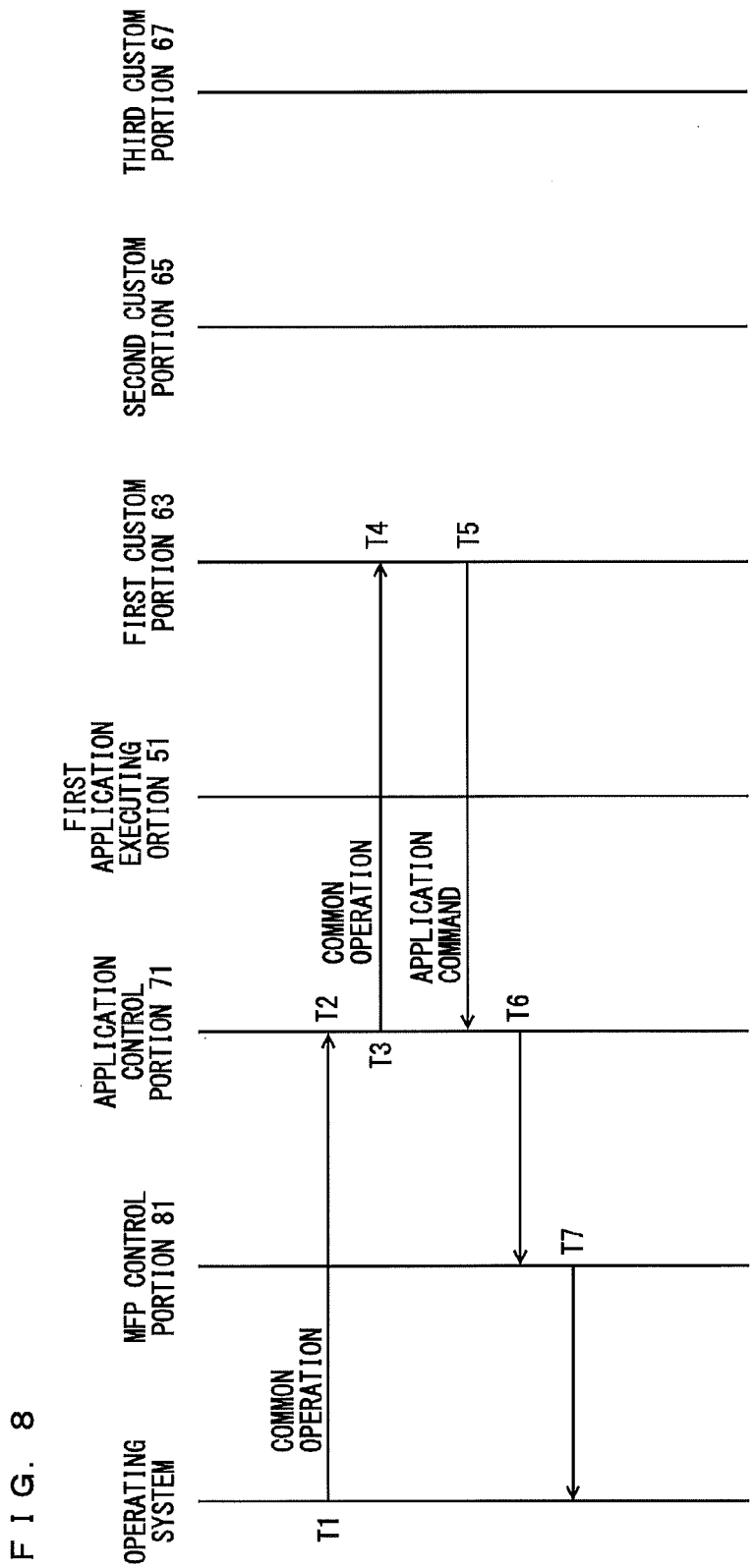
FIG. 8 is a diagram illustrating an example of the temporal flow of signals when a common operation is input.

FIG. 8 is a diagram illustrating an example of the temporal flow of signals when a common operation is input. Referring to FIG. 8, time flows from the top downward. Time axes are shown, starting from the left, for the operating system, MFP control portion 81, application control portion 71, first application executing portion 51, first custom portion 63, second custom portion 65, and third custom portion 67.

First, the operating system detects that a common operation has been input to operation portion 163 (T1). The operating system stores the operation input to operation portion 163, into a predetermined area in RAM 114. Application control portion 71, which is monitoring this area in RAM 114 predetermined for the common operations, detects that the common operation has been input (T2). Then, application control portion 71 acquires a task that is in the currently selected state. It is here assumed that first custom portion 63 is determined to be the task in the currently selected state. Application control portion 71 outputs the common operation to first custom portion 63 (T3).

When first custom portion 63 receives the common operation (T4), first custom portion 63 performs a process determined by the first application program in accordance with the common operation, and outputs an application command to application control portion 71 (T5).

When application control portion 71 receives the application command, application control portion 71 converts the application command into an internal command, and outputs the internal command to MFP control portion 81 (T6). MFP control portion 81 converts the received internal command into an operating command, and outputs the operating command to the operating system (T7).

Figure 9:
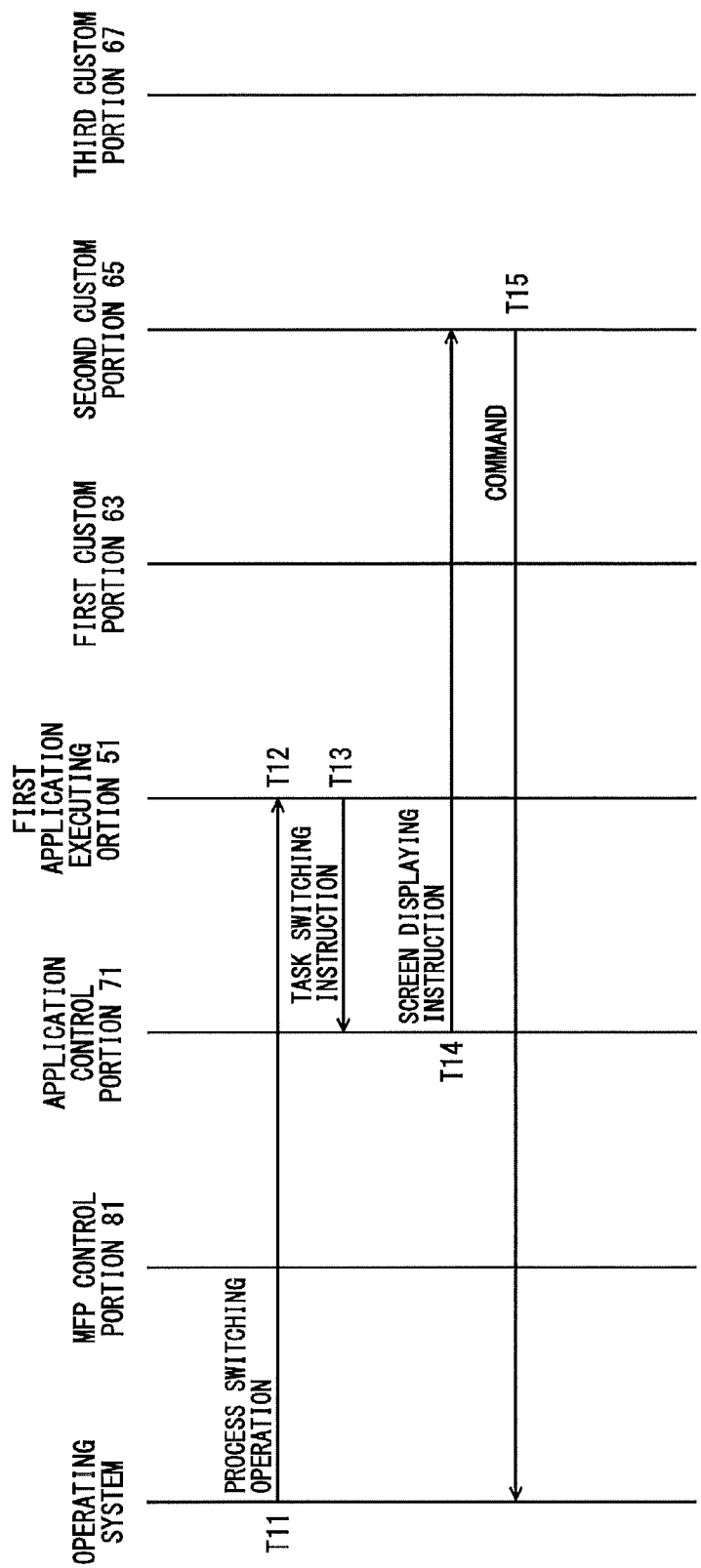
FIG. 9 is a diagram illustrating an example of the temporal flow of signals when a process switching operation is input.

FIG. 9 is a diagram illustrating an example of the temporal flow of signals when a process switching operation is input. Referring to FIG. 9, time flows from the top downward. Time axes are shown, starting from the left, for the operating system, MFP control portion 81, application control portion 71, first application executing portion 51, first custom portion 63, second custom portion 65, and third custom portion 67.

First, the operating system detects that a process switching operation has been input to operation portion 163 (T11). The operating system stores the operation input to operation portion 163, into a predetermined area in RAM 114. First application executing portion 51, which is monitoring this area in RAM 114 predetermined for the process switching operations, detects that the process switching operation has been input (T12). Then, first application executing portion 51 determines a task to be switched to a currently selected state. It is here assumed that second custom portion 65 is determined as the task to be switched to the currently selected state. First application executing portion 51 outputs a task switching instruction for switching second custom portion 65 to the currently selected state, to application control portion 71 (T13).

When application control portion 71 receives the task switching instruction, application control portion 71 sets second custom portion 65 to the currently selected state in accordance with the task switching instruction, and outputs a screen displaying instruction to second custom portion 65 (T14). On receipt of the screen displaying instruction, second custom portion 65 outputs a command for displaying a screen, to the operating system (T15).

Figure 10:
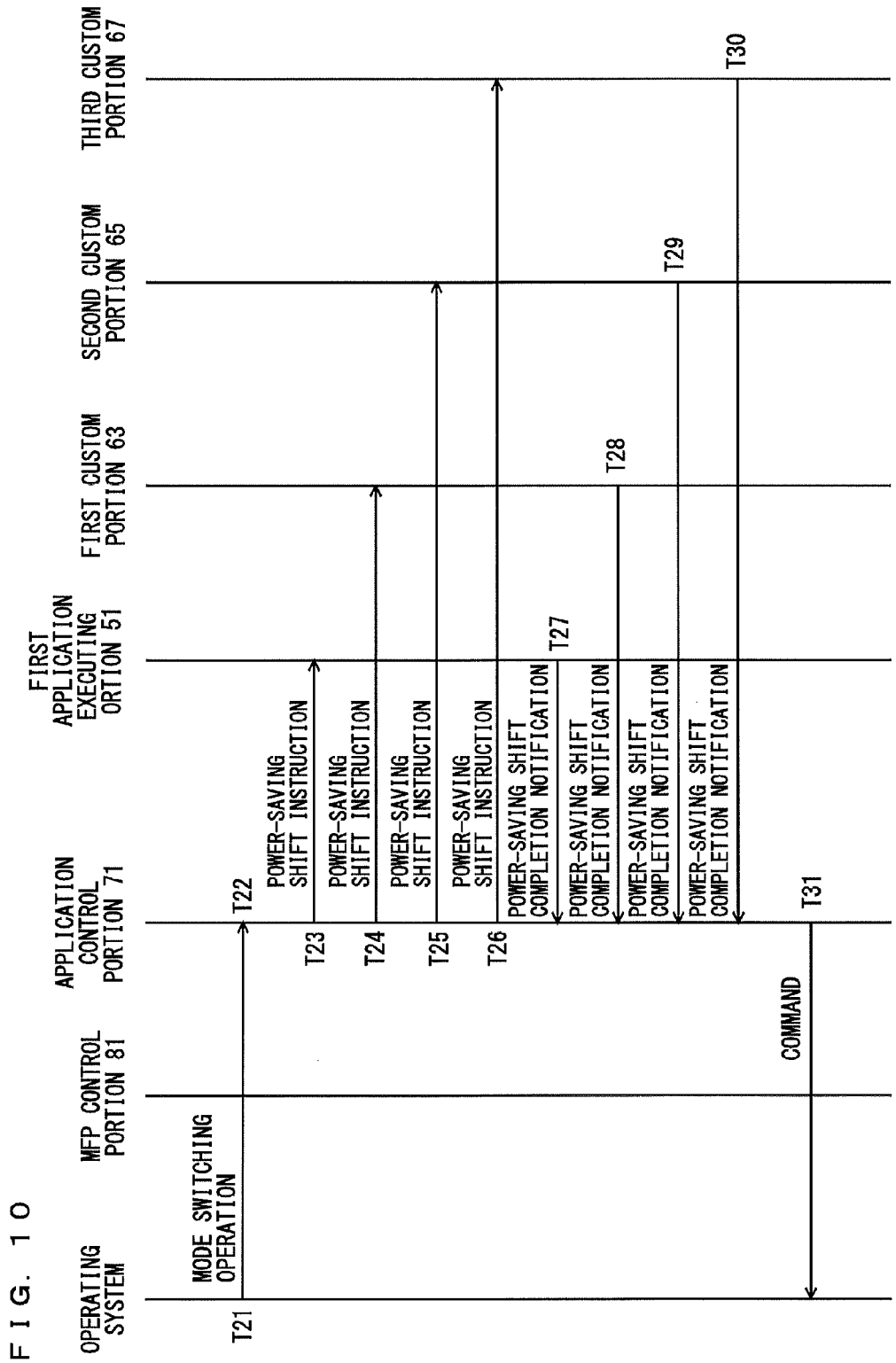
FIG. 10 is a diagram illustrating an example of the temporal flow of signals when a mode switching operation is input.

FIG. 10 is a diagram illustrating an example of the temporal flow of signals when a mode switching operation is input. Referring to FIG. 10, time flows from the top downward. Time axes are shown, starting from the left, for the operating system, MFP control portion 81, application control portion 71, first application executing portion 51, first custom portion 63, second custom portion 65, and third custom portion 67.

First, the operating system detects that a mode switching operation has been input to operation portion 163 (T21). The operating system stores the operation input to operation portion 163, into a predetermined area in RAM 114. Application control portion 71, which is monitoring this area in RAM 114 predetermined for the mode switching operations, detects that the mode switching operation has been input (T22). Then, application control portion 71 outputs a power-saving shift instruction to first application executing portion 51, first custom portion 63, second custom portion 65, and third custom portion 67 (T23 to T26).

When first application executing portion 51 receives the power-saving shift instruction, it suspends the process being executed, and outputs a power-saving shift completion notification to application control portion 71 (T27). When first custom portion 63 receives the power-saving shift instruction, it suspends the process being executed, and outputs a power-saving shift completion notification to application control portion 71 (T28). When second custom portion 65 receives the power-saving shift instruction, it suspends the process being executed, and outputs a power-saving shift completion notification to application control portion 71 (T29). When third custom portion 67 receives the power-saving shift instruction, it suspends the process being executed, and outputs a power-saving shift completion notification to application control portion 71 (T30).

When application control portion 71 receives the power-saving shift completion notifications from all of first application executing portion 51 and first, second, and third custom portions 63, 65, and 67, application control portion 71 outputs a command for turning off the display on display portion 161, to the operating system (T31).

Figure 11:
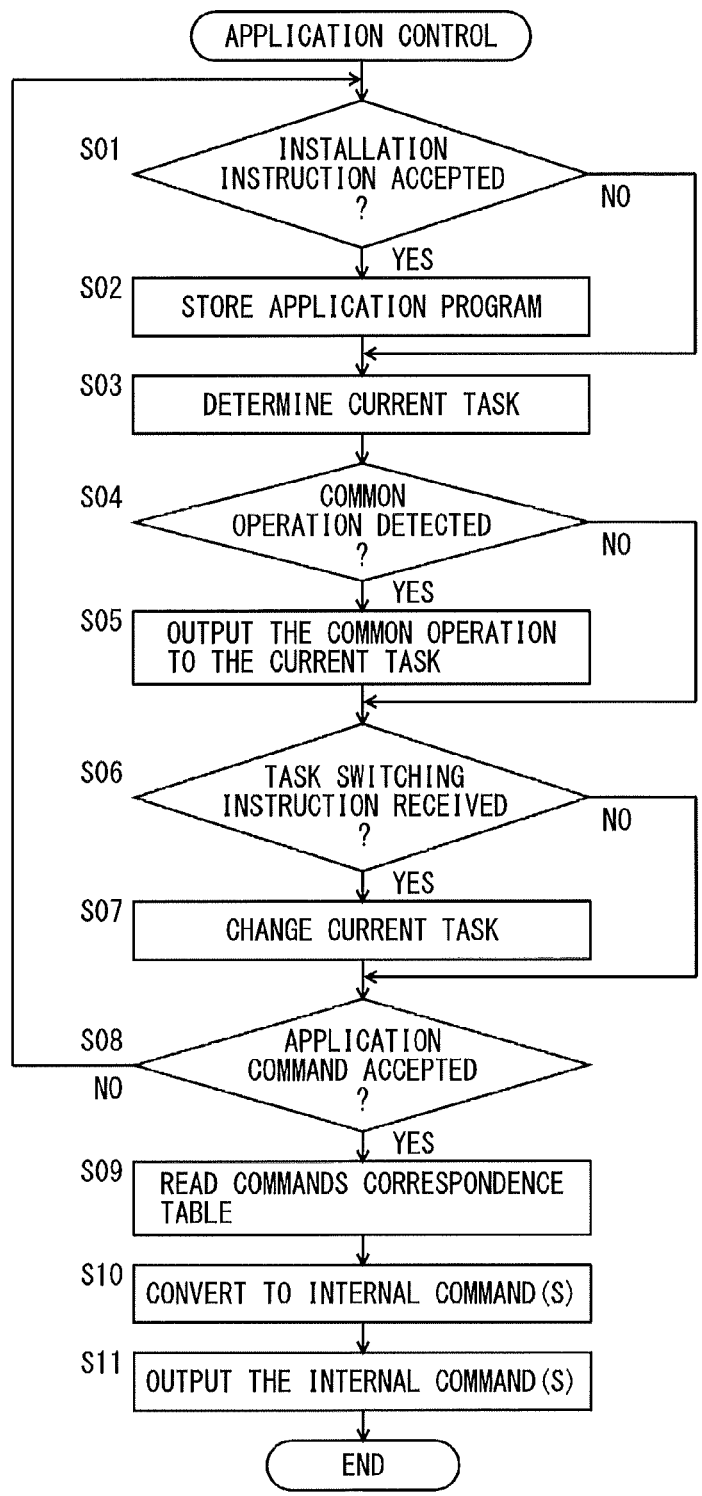
FIG. 11 is a flowchart illustrating an example of the flow of an application control process.

FIG. 11 is a flowchart illustrating an example of the flow of an application control process. The application control process is carried out by CPU 111 included in MFP 100 as CPU 111 executes the application control program stored in ROM 113, HDD 115, or CD-ROM 118. Referring to FIG. 11, CPU 111 determines whether an installation instruction has been accepted (step S01). If so ("YES" in step S01), the process proceeds to step S02; otherwise ("NO" in step S01), the process proceeds to step S03.

In step S02, CPU 111 stores into HDD 115 an application program which is input from the outside along with the installation instruction. The process then proceeds to step S03. In the case where communication I/F portion 112 receives the installation instruction from PC 200 in step S01, the application program that communication I/F portion 112 receives from PC 200 is stored into HDD 115. In the case where operation portion 163 accepts the installation instruction in step S01, the application program that external storage device 117 reads from CD-ROM 118 is stored into HDD 115. Alternatively, an application program may be downloaded from a server connected to the Internet.

In the following step S03, CPU 111 determines a current task. CPU 111 determines one of first, second, and third custom portions 63, 65, and 67 that has been set in the currently selected state, as the current task. In the case where step S07, as will be described below, is performed, CPU 111 determines the task set in step S07, as the current task. After MFP 100 is turned on and before step S07 (described below) is executed, one of first, second, and third custom portions 63, 65, and 67 is started on the basis of a start-up operation by a user. For example, a start-up screen including buttons for starting first, second, and third custom portions 63, 65, and 67, respectively, is displayed on operation panel 160, and a task corresponding to the button designated by a user is started. Of first, second, and third custom portions 63, 65, and 67, the lastly started task is determined to be the current task.

In the following step S04, CPU 111 determines whether a common operation has been detected. In the case where a common operation predetermined from among the operations that may be input to operation panel 160 by a user is input, CPU 111 detects the common operation. If CPU 111 has detected a common operation, the process proceeds to step S05; otherwise, the process proceeds to step S06. In step S05, CPU 111 outputs the common operation to the current task, and the process proceeds to step S06.

In step S06, CPU 111 determines whether a task switching instruction has been input from the task (first application executing portion 51) that executes the application switching program. If so, the process proceeds to step S07; otherwise, the process proceeds to step S08. In step S07, CPU 111 changes the current task in accordance with the task switching instruction received in step S06, and the process proceeds to step S08. Specifically, CPU 111 selects, from first, second, and third custom portions 63, 65, and 67 included in second application executing portion 61, the task specified by the application identification information that is included in the task switching instruction received in step S06, and sets the selected task to the currently selected state, in place of the task that had been in the currently selected state until then.

In step S08, CPU 111 determines whether an application command has been accepted. In the case where an application command is input from a task (one of first, second, and third custom portions 63, 65, and 67) which executes an application program, CPU 111 accepts the application command. If an application command has been accepted, the process proceeds to step S09; otherwise, the process returns to step S01.

In step S09, CPU 111 reads a commands correspondence table stored in HDD 115. The commands correspondence table associates one application command with one or more internal commands. CPU 111 refers to the commands correspondence table to convert the application command, accepted in step S08, into one or more internal commands (step S10). In the following step S11, CPU 111 outputs the internal command(s) to the task (MFP control portion 81) that executes the MFP control program. The process then returns to step S01.

Figure 12:
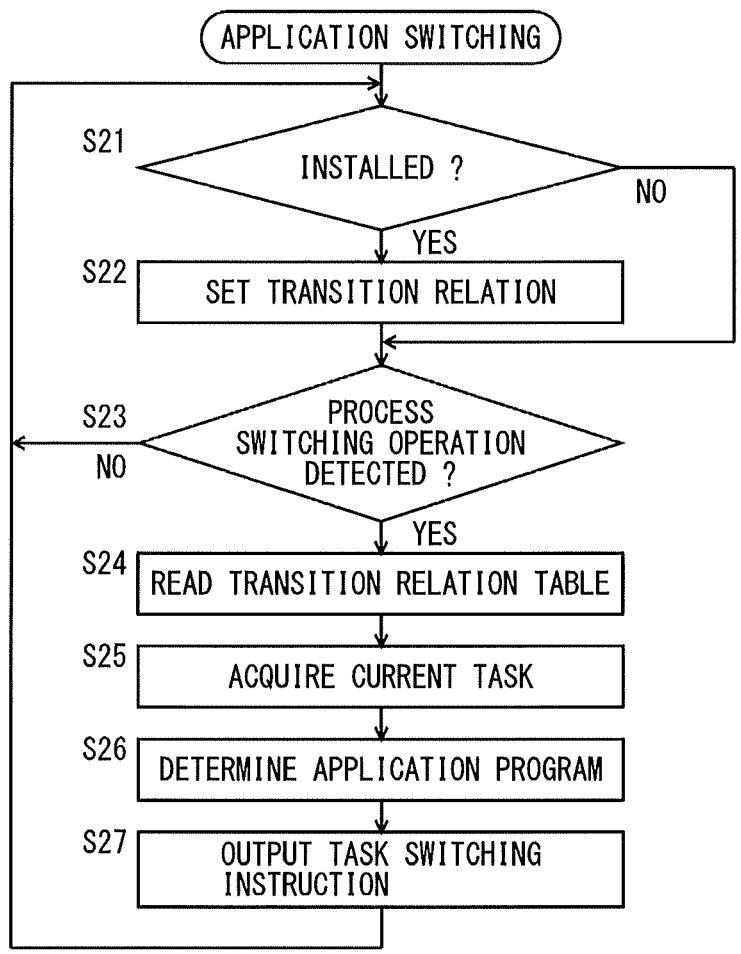
FIG. 12 is a flowchart illustrating an example of the flow of an application switching process.

FIG. 12 is a flowchart illustrating an example of the flow of an application switching process. The application switching process is carried out by CPU 111 included in MFP 100 as CPU 111 executes the application switching program stored in ROM 113, HDD 115, or CD-ROM 118. Referring to FIG. 12, CPU 111 determines whether an application program for customization has been installed (step S21). If so, the process proceeds to step S22; otherwise, the process proceeds to step S23.

In step S22, CPU 111 sets transition relation. CPU 111 associates, for the customization application program detected in step S21, each process switching operation with one of the application programs already installed. Specifically, CPU 111 generates a transition record including the application identification information of the customization application program detected in step S21, the operation identification information of a process switching operation, and the application identification information of one of the application programs already installed, and adds the generated record into the transition relation table stored in HDD 115. More specifically, a setting screen is displayed on display portion 161, in which a list of a plurality of process switching operations is displayed and further, application identification information item(s) of the one or more application programs already installed is/are selectably displayed for each of the process switching operations. When one of the application identification information item(s) of the already installed application program(s) is selected for each of the plurality of process switching operations in accordance with a user operation input to touch panel 165 or hard key portion 167, the transition records of the same number as the process switching operations are generated. Here, the process switching operations are the operations of depressing the respective process switching keys 167A, 167B, and 167C included in the keys in hard key portion 167.

In step S23, CPU 111 determines whether a process switching operation has been detected. If so, the process proceeds to step S24; otherwise, the process returns to step S21. If a user depresses one of process switching keys 167A, 167B, and 167C included in the keys in hard key portion 167, operation portion 163 detects the depression of the process switching key 167A, 167B, or 167C, and thus the process switching operation is detected.

In step S24, CPU 111 reads a transition relation table stored in HDD 115. Then, CPU 111 acquires a current task (step S25). Specifically, CPU 111 acquires the application identification information for identifying the task that has been set in the currently selected state.

In the following step S26, CPU 111 determines an application program executed by a task to be set to the currently selected state next. Specifically, CPU 111 acquires the application identification information that is associated with the application identification information of the current task acquired in step S25, and the operation identification information of the process switching operation detected in step S23, by the transition relation table read in step S24.

In the following step S27, CPU 111 outputs a task switching instruction which includes the application identification information acquired in step S26 and instructs to change the current task, to the task for executing the application control program. The process then returns to step S21. This task switching instruction is accepted in step S06 in the application control process, shown in FIG. 11, executed by the task for executing the application control program.

As described above, MFP 100 according to the present embodiment functions as an image forming apparatus. CPU 111 included in MFP 100 includes: MFP control portion 81 which, when an internal command is input, performs a process predetermined for the input internal command for controlling the hardware resource(s); first application executing portion 51 which executes the application switching program; first, second, and third custom portions 63, 65, and 67 which each execute a corresponding application program for customization; and application control portion 71 which executes the application control program. When one of first, second, and third custom portions 63, 65, and 67 outputs an application command, application control portion 71 converts the output application command into an internal command, and outputs the obtained internal command to MFP control portion 81. Application control portion 71 includes: current task setting portion 75 which sets one of first, second, and third custom portions 63, 65, and 67 to a currently selected state in which a common operation can be input; and arbitration portion 77 which, when a common operation is accepted, outputs operation identification information of the common operation to the one of first, second, and third custom portions 63, 65, and 67 that has been set in the currently selected state.

First application executing portion 51 which executes the application switching program includes post-transition application determining portion 57 which, when a process switching operation is accepted, determines one of first, second, and third custom portions 63, 65, and 67 that should be switched to the currently selected state next, by referring to a transition relation table, on the basis of the process switching operation and the one of first, second, and third custom portions 63, 65, and 67 that is in the currently selected state. Current task setting portion 75 included in application control portion 71 sets the one of first, second, and third custom portions 63, 65, and 67 that has been determined by post-transition application determining portion 57, to the currently selected state.

In the state where one of first, second, and third custom portions 63, 65, and 67 has been set in the currently selected state by application control portion 71 which executes the application control program, when a common operation is accepted, application control portion 71 outputs the operation identification information of the common operation to the one of first, second, and third custom portions 63, 65, and 67 that is in the currently selected state. When a process switching operation is accepted, first application executing portion 51 which executes the application switching program determines one of first, second, and third custom portions 63, 65, and 67 that should be switched to the currently selected state next, on the basis of the process switching operation and the one of first, second, and third custom portions 63, 65, and 67 that has been set in the currently selected state. Then, application control portion 71 sets the determined custom portion, 63, 65, or 67, to the currently selected state. As such, in the case where a process switching operation is accepted, first application executing portion 51 determines the one of first, second, and third custom portions 63, 65, and 67 that should be brought into the currently selected state next. All that is required for application control portion 71 is to set the one of first, second, and third custom portions 63, 65, and 67 that has been determined by first application executing portion 51 to the currently selected state. When a process switching operation is accepted, application control portion 71 does not have to determine which one of first, second, and third custom portions 63, 65, and 67 should be brought into the currently selected state next. Accordingly, in the case where a new application program is installed, it is unnecessary to change application control portion 71 or the application control program. An application program can thus be installed without depending upon the hardware resources included in MFP 100.

Furthermore, at the stage when an application program is installed, first application executing portion 51 updates the transition relation table which associates each of one or more process switching operations with one of first, second, and third custom portions 63, 65, and 67. When a process switching operation is detected, the one of first, second, and third custom portions 63, 65, and 67 that is associated with the process switching operation by the transition relation table with respect to the one of first, second, and third custom portions 63, 65, and 67 that is in the currently selected state, is switched to the currently selected state. Each process switching operation is associated with one of first, second, and third custom portions 63, 65, and 67 at the stage when an application program is installed. This eliminates the need to change the application switching program.

While MFP 100 has been described as an example of the image forming apparatus in the above embodiment, the present invention may of course be understood as an application switching method for causing MFP 100 to perform the processing shown in FIGS. 11 and 12, or as an application switching program for causing CPU 111 to perform the application switching method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus having
   hardware resources including an operation accepting portion to accept an instruction operation designated by an operation user from among a plurality of kinds of operations, and
   a control portion to control said hardware resources,
   said control portion comprising:
      an internal control portion operable, in response to an input of an internal command, to execute a process predetermined for said input internal command in order to control said hardware resources;
      a first application executing portion to execute an application switching program;
      a plurality of second application executing portions each configured to execute a corresponding customization application program different from said application switching program; and
      an application control portion operable, in the case where one of said plurality of second application executing portions outputs an application command which has been released for controlling said internal control portion, to convert said output application command into said internal command and output said obtained internal command to said internal control portion, said application control portion including
a current task setting portion to set one of said plurality of second application executing portions to a currently selected state in which the portion is capable of receiving a common operation predetermined from among a plurality of operations acceptable by said operation accepting portion, and
an arbitration portion operable, in the case where said common operation is accepted by said operation accepting portion, to output operation identification information for identifying the common operation to the one of said plurality of second application executing portions that has been set in the currently selected state;
said first application executing portion including a post-transition application determining portion operable, in the case where said operation accepting portion accepts a process switching operation predetermined, besides said common operation, from among the plurality of operations acceptable by the operation accepting portion, to determine one of said plurality of second application execution portions that should be changed to the currently selected state next, on the basis of the one of said plurality of second application executing portions being set in the currently selected state and on the basis of said accepted process switching operation,
said current task setting portion setting said second application executing portion determined by said post-transition application determining portion to the currently selected state.

2. The image forming apparatus according to claim 1, wherein said first application executing portion further includes
a transition relation setting portion operable, at the stage of installation of each of said plurality of customization application programs, to associate, for the customization application program, said process switching operation, included in the plurality of operations acceptable by said operation accepting portion, with one of said plurality of second application executing portions, and
a process switching operation detecting portion to detect said process switching operation accepted by said operation accepting portion, and
when said process switching operation is detected, said post-transition application determining portion determines said second application executing portion that is associated with said detected process switching operation by said transition relation setting portion with respect to said customization application program executed by the one of said plurality of second application executing portions being set in the currently selected state.

3. The image forming apparatus according to claim 2, wherein
said first application executing portion stores a transition relation table, the transition relation table associating, for each of said plurality of customization application programs, operation identification information for identifying said process switching operation with application identification information for identifying one of said plurality of customization application programs, and
said post-transition application determining portion determines the application identification information that is associated with the operation identification information of said process switching operation by said transition relation table with respect to said customization application program executed by the one of said plurality of second application executing portions being set in the currently selected state.

4. The image forming apparatus according to claim 1, wherein the process switching operation accepted by said operation accepting portion is assigned to a predetermined key among a plurality of keys included in said operation accepting portion.

5. An application switching method performed by an image forming apparatus, the image forming apparatus having
hardware resources including an operation accepting portion to accept an instruction operation designated by an operation user from among a plurality of kinds of operations, and
a control portion to control said hardware resources,
said control portion including
an internal control portion operable, in response to an input of an internal command, to execute a process predetermined for said input internal command in order to control said hardware resources,
a plurality of application executing portions each configured to execute a corresponding customization application program different from an application switching program, and
an application control portion operable, in the case where one of said plurality of application executing portions outputs an application command which has been released for controlling said internal control portion, to convert said output application command into said internal command and output said obtained internal command to said internal control portion,
said application control portion including
a current task setting portion to set one of said plurality of application executing portions to a currently selected state in which the portion is capable of receiving a common operation predetermined from among a plurality of operations acceptable by said operation accepting portion, and
an arbitration portion operable, in the case where said common operation is accepted by said operation accepting portion, to output operation identification information for identifying the common operation to the one of said plurality of application executing portions that has been set in the currently selected state,
the method causing said control portion to perform:
a post-transition application determining step of, in the case where said operation accepting portion accepts a process switching operation predetermined, besides said common operation, from among the plurality of operations acceptable by the operation accepting portion, determining one of said plurality of application execution portions that should be changed to the currently selected state next, on the basis of the one of said plurality of application executing portions being set in the currently selected state and on the basis of said accepted process switching operation; and
a step of causing said current task setting portion to set said determined application executing portion to the currently selected state.

6. The application switching method according to claim 5, causing said image forming apparatus to further perform:
a transition relation setting step of, at the stage of installation of each of said plurality of customization application programs, associating, for the customization application program, said process switching operation, included in the plurality of operations acceptable by said operation accepting portion, with one of said plurality of application executing portions; and a process switching operation detecting step of detecting said process switching operation accepted by said operation accepting portion; wherein said post-transition application determining step includes a step of, in the case where said process switching operation is detected, determining said application executing portion that has been associated with said detected process switching operation in said transition relation setting step with respect to said customization application program executed by the one of said plurality of application executing portions being set in the currently selected state.

7. The application switching method according to claim 6, wherein said image forming apparatus stores a transition relation table, the transition relation table associating, for each of said plurality of customization application programs, operation identification information for identifying said process switching operation with application identification information for identifying one of said plurality of customization application programs, and said post-transition application determining step includes a step of determining the application identification information that is associated with the operation identification information of said process switching operation by said transition relation table with respect to said customization application program executed by the one of said plurality of application executing portions being set in the currently selected state.

8. The application switching method according to claim 5, wherein the process switching operation accepted by said operation accepting portion is assigned to a predetermined key among a plurality of keys included in said operation accepting portion.

9. A non-transitory computer-readable recording medium encoded with an application switching program performed by a computer which controls an image forming apparatus having hardware resources including an operation accepting portion to accept an instruction operation designated by an operation user from among a plurality of kinds of operations, said computer including an internal control portion operable, in response to an input of an internal command, to execute a process predetermined for said input internal command in order to control said hardware resources, a plurality of application executing portions each configured to execute a corresponding customization application program different from an application switching program, and an application control portion operable, in the case where one of said plurality of application executing portions outputs an application command which has been released for controlling said internal control portion, to convert said output application command into said internal command and output said obtained internal command to said internal control portion, said application control portion including a current task setting portion to set one of said plurality of application executing portions to a currently selected state in which the portion is capable of receiving a common operation predetermined from among a plurality of operations acceptable by said operation accepting portion, and an arbitration portion operable, in the case where said common operation is accepted by said operation accepting portion, to output operation identification information for identifying the common operation to the one of said plurality of application executing portions that has been set in the currently selected state, the program causing said computer to perform:

a post-transition application determining step of, in the case where said operation accepting portion accepts a process switching operation predetermined, besides said common operation, from among the plurality of operations acceptable by the operation accepting portion, determining one of said plurality of application execution portions that should be changed to the currently selected state next, on the basis of the one of said plurality of application executing portions being set in the currently selected state and on the basis of said accepted process switching operation; and a step of causing said current task setting portion to set said determined application executing portion to the currently selected state.

10. The non-transitory computer-readable recording medium encoded with the application switching program according to claim 9, causing said computer to further perform:

a transition relation setting step of, at the stage of installation of each of said plurality of customization application programs, associating, for the customization application program, said process switching operation, included in the plurality of operations acceptable by said operation accepting portion, with one of said plurality of application executing portions; and a process switching operation detecting step of detecting said process switching operation accepted by said operation accepting portion; wherein said post-transition application determining step includes a step of, in the case where said process switching operation is detected, determining said application executing portion that has been associated with said detected process switching operation in said transition relation setting step with respect to said customization application program executed by the one of said plurality of application executing portions being set in the currently selected state.

11. The non-transitory computer-readable recording medium encoded with the application switching program according to claim 10, wherein said image forming apparatus stores a transition relation table, the transition relation table associating, for each of said plurality of customization application programs, operation identification information for identifying said process switching operation with application identification information for identifying one of said plurality of customization application programs, and said post-transition application determining step includes a step of determining the application identification information that is associated with the operation identification information of said process switching operation by said transition relation table with respect to said customization application program executed by the one of said plurality of application executing portions being set in the currently selected state.

12. The non-transitory computer-readable recording medium encoded with the application switching program according to claim 9, wherein the process switching operation accepted by said operation accepting portion is assigned to a predetermined key among a plurality of keys included in said operation accepting portion.

* * * * *